No. 769,671. PATENTED SEPT. 6, 1904.
W. R. VERSTRAELEN & C. ALTER.
SELF PLAYING ZITHER.
APPLICATION FILED SEPT. 3, 1903.
NO MODEL. 12 SHEETS—SHEET 1.

WITNESSES:
Edward Thorpe

INVENTORS
William R. Verstraelen
Christian Alter
BY
ATTORNEYS

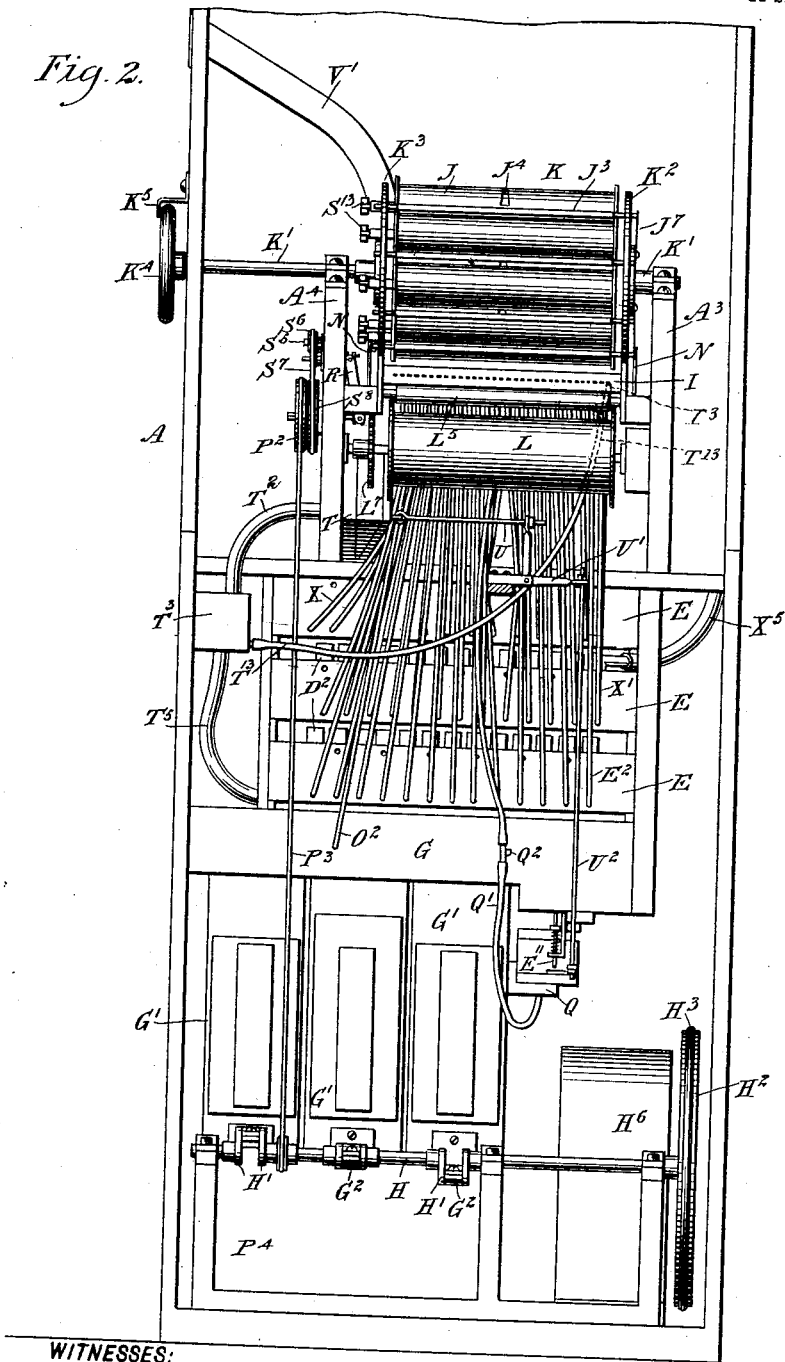

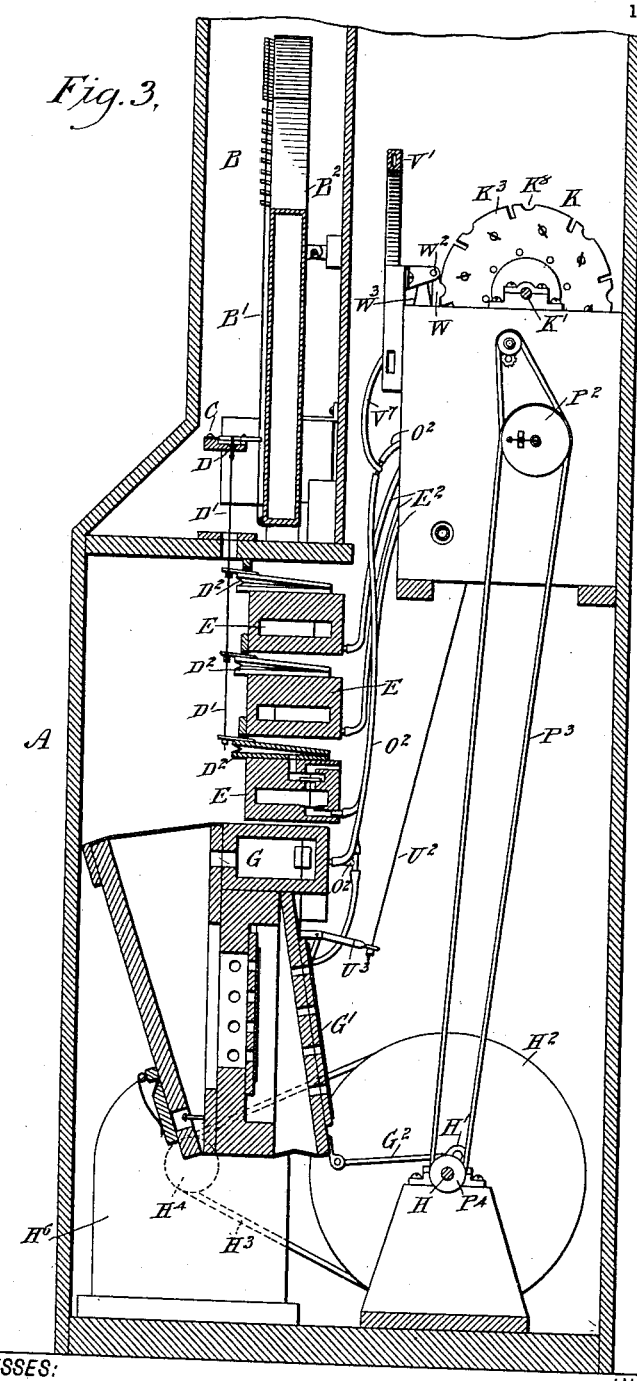

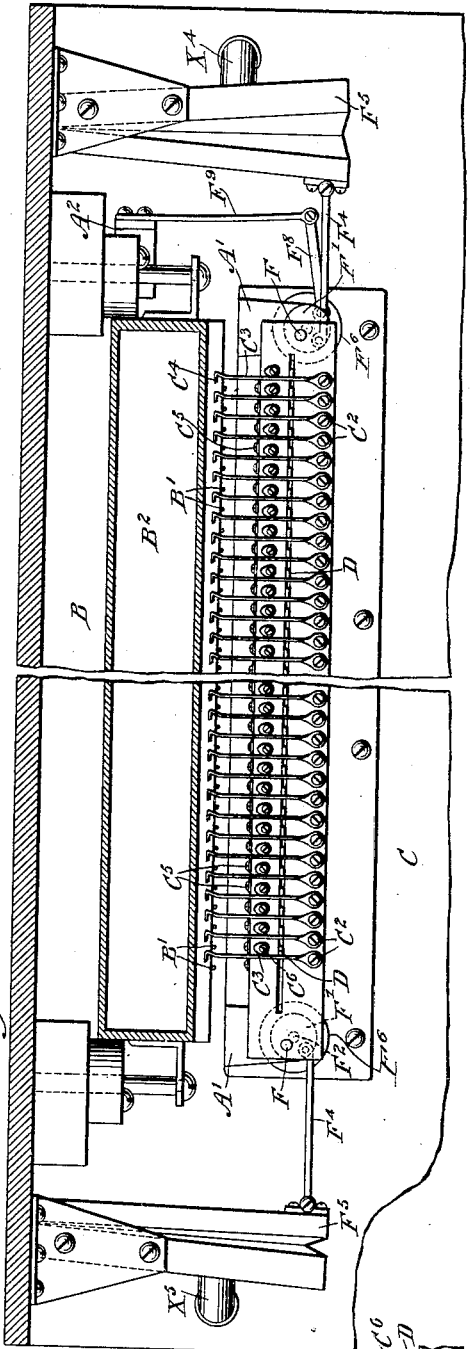
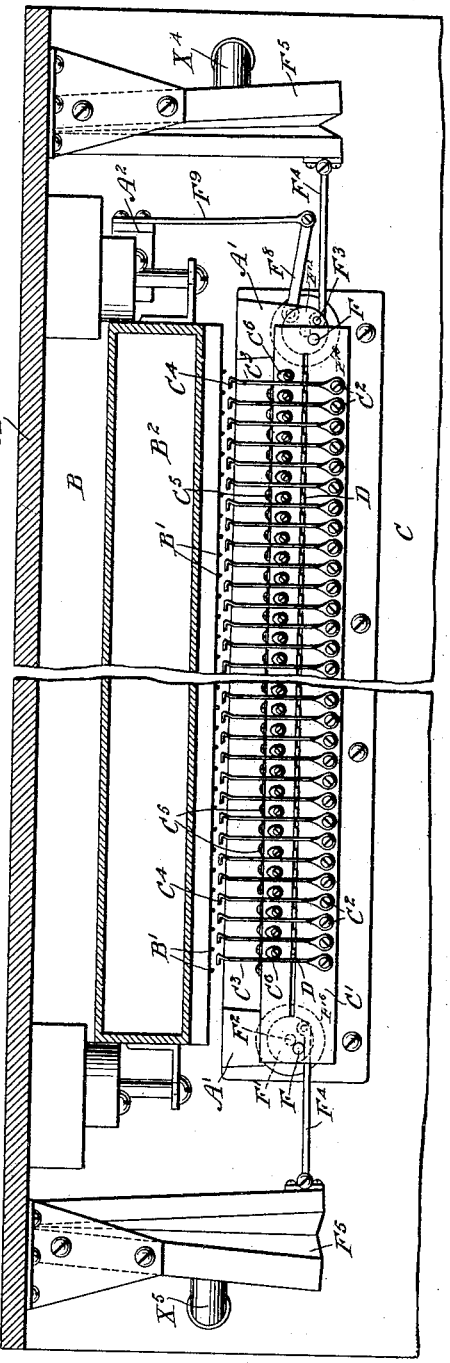
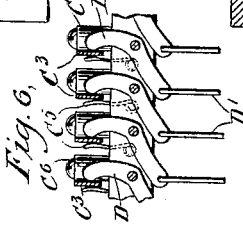

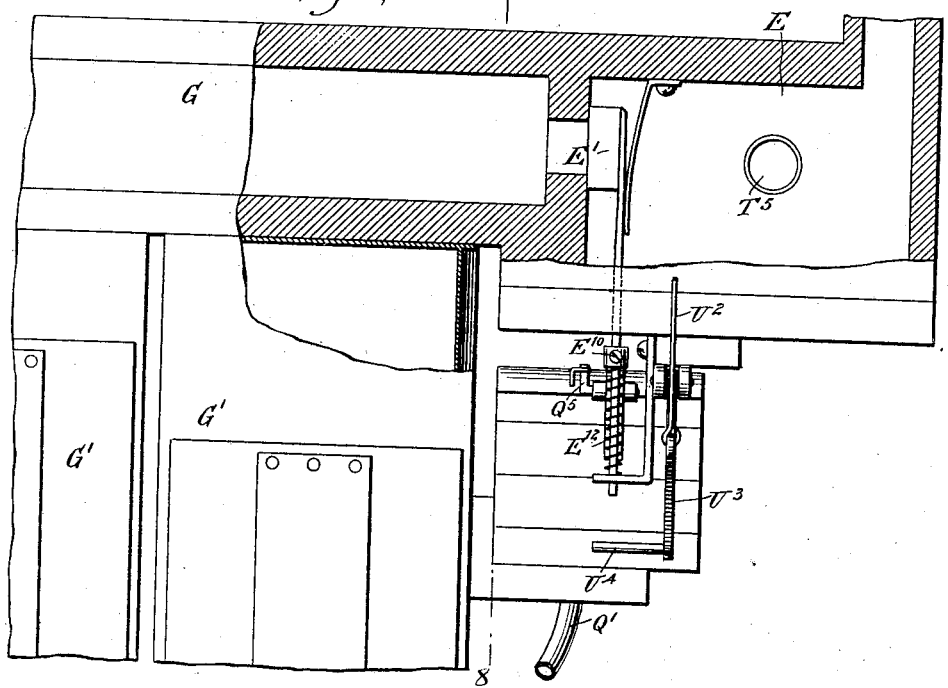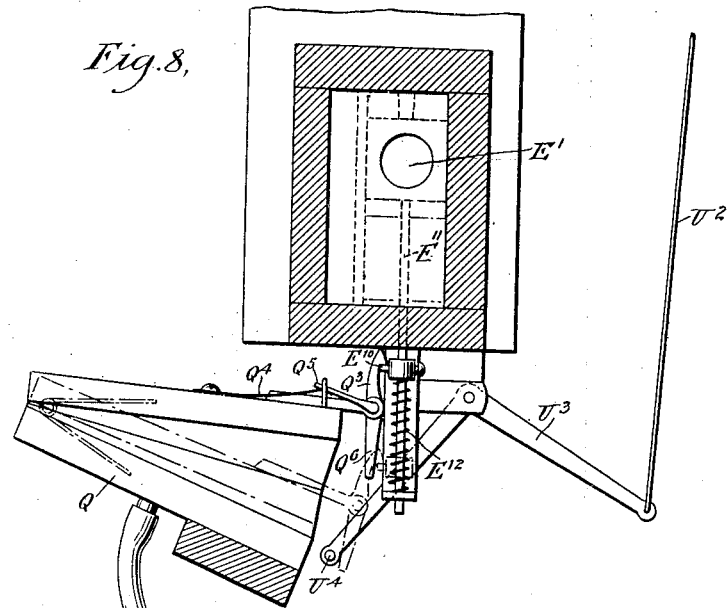

No. 769,671. PATENTED SEPT. 6, 1904.
W. R. VERSTRAELEN & C. ALTER.
SELF PLAYING ZITHER.
APPLICATION FILED SEPT. 3, 1903.
NO MODEL.
12 SHEETS—SHEET 6.
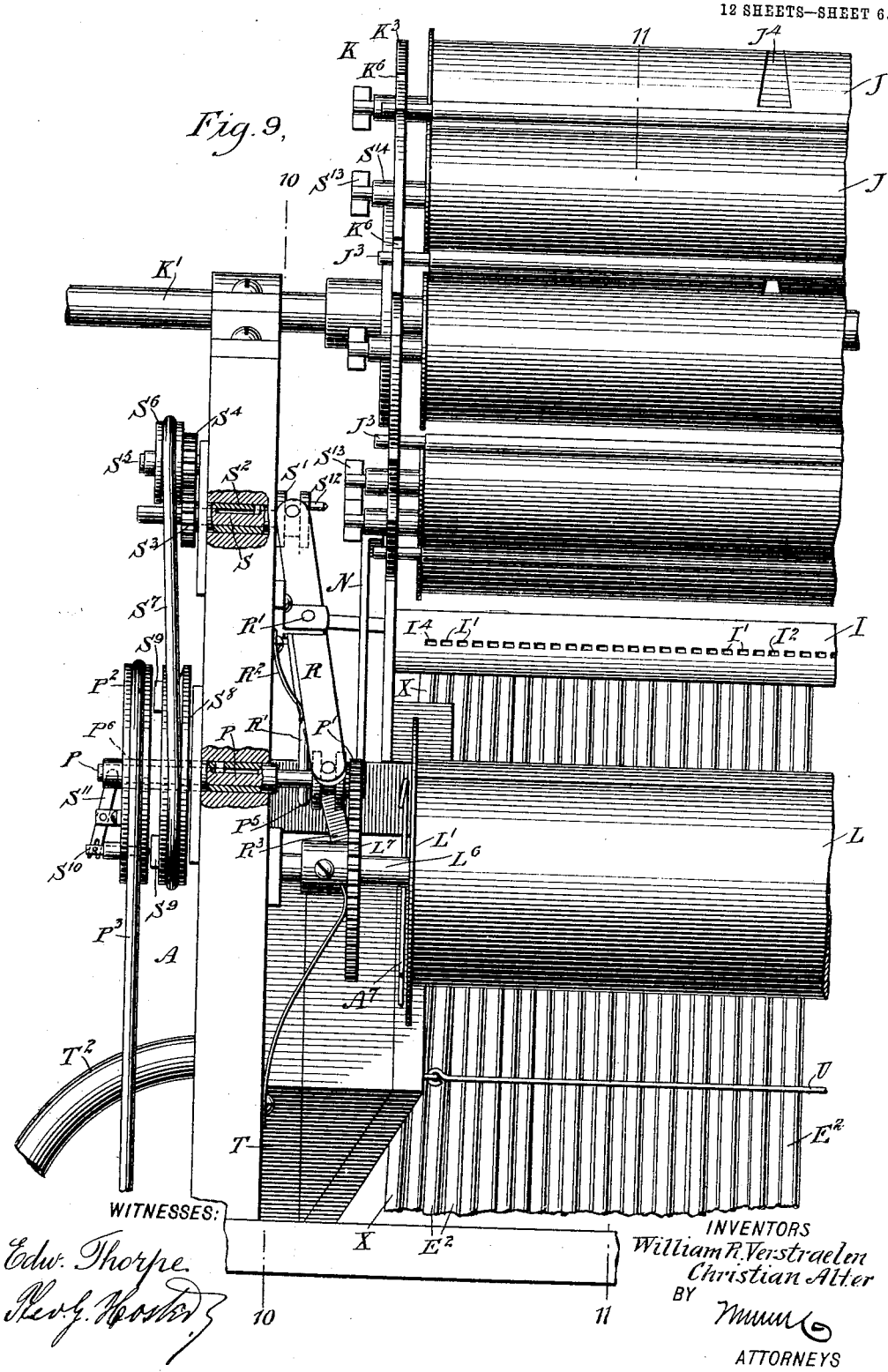
Fig. 9,
WITNESSES:
Edw. Thorpe.
Rev. G. Koster
INVENTORS
William R. Verstraelen
Christian Alter
BY
ATTORNEYS

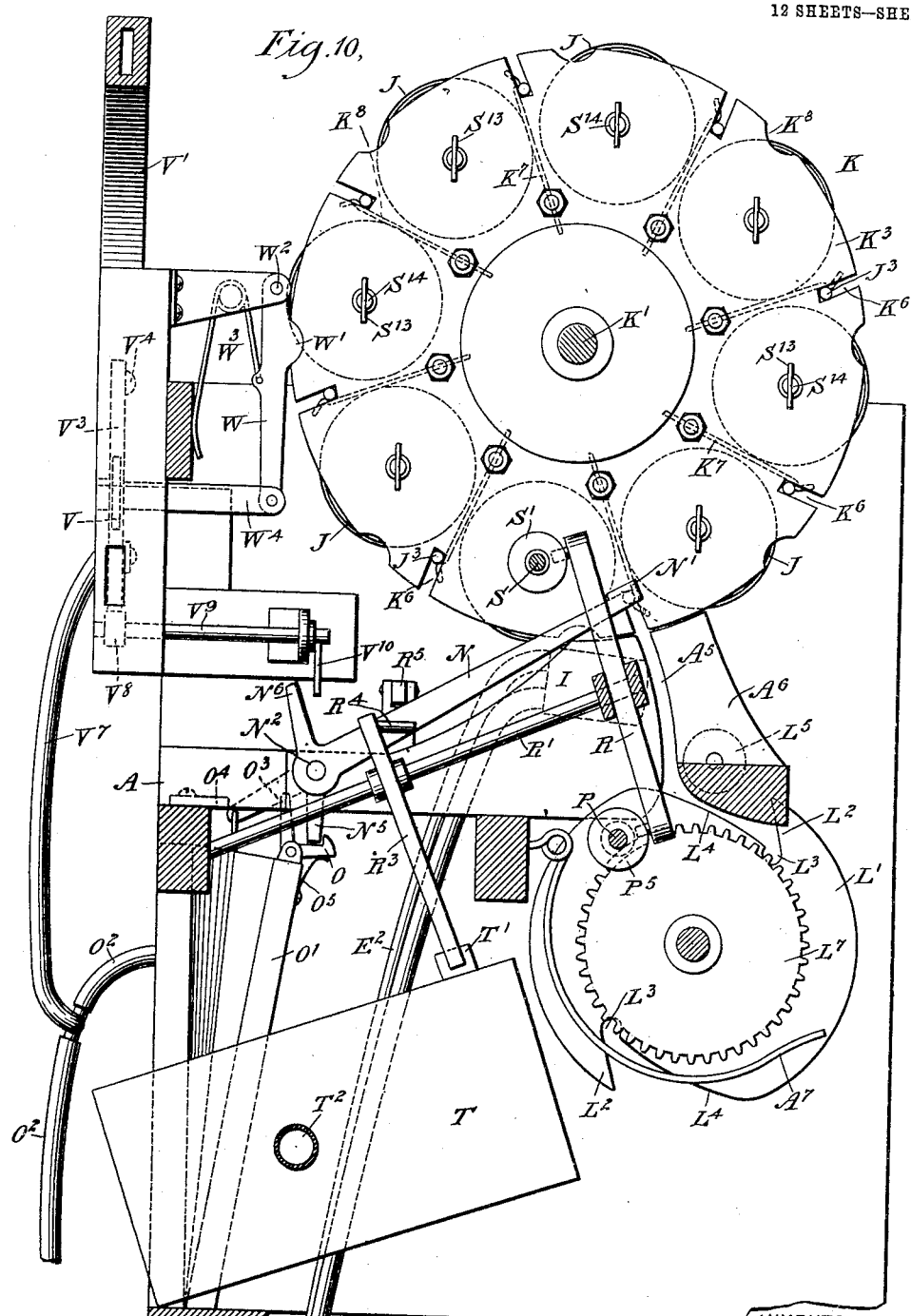

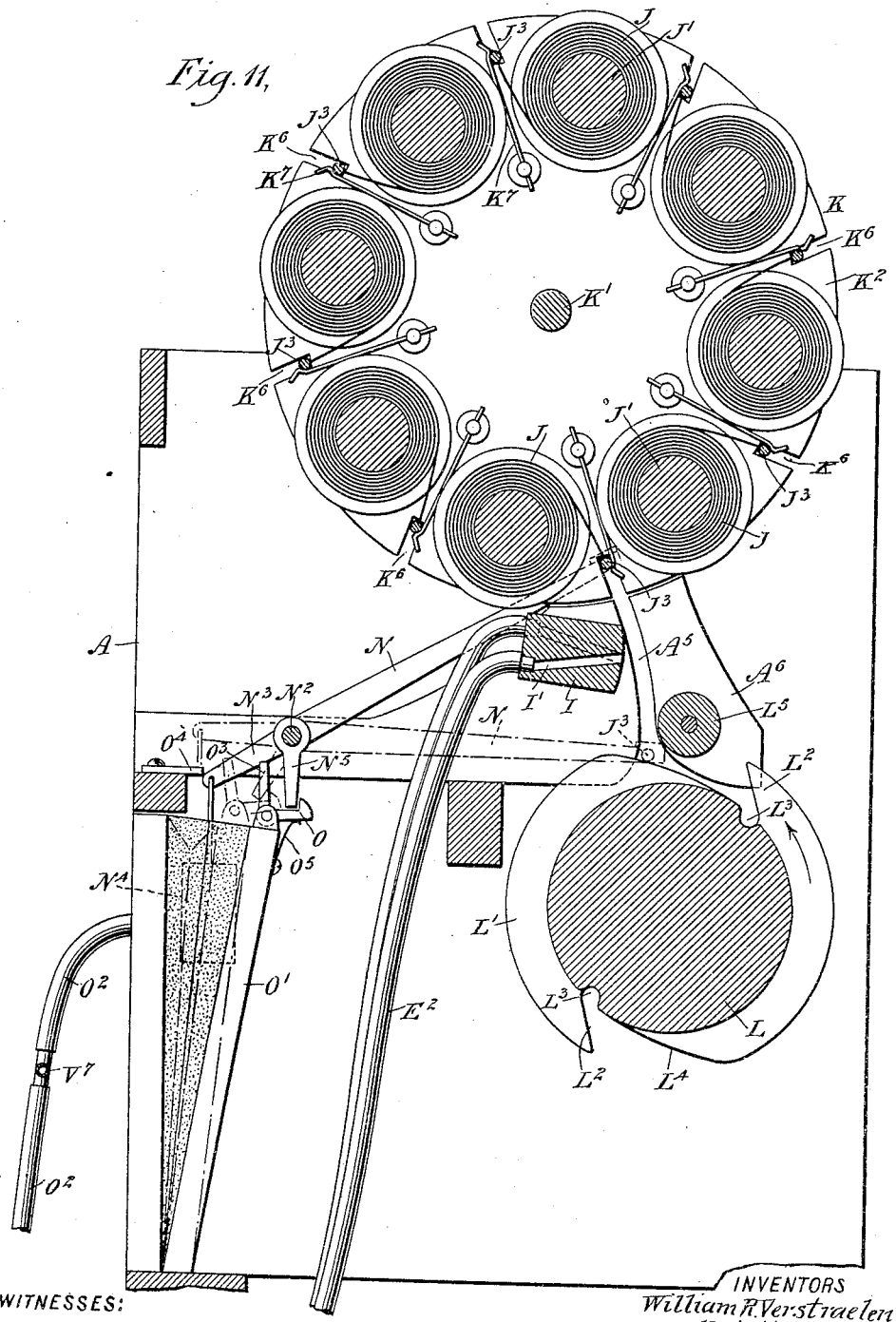

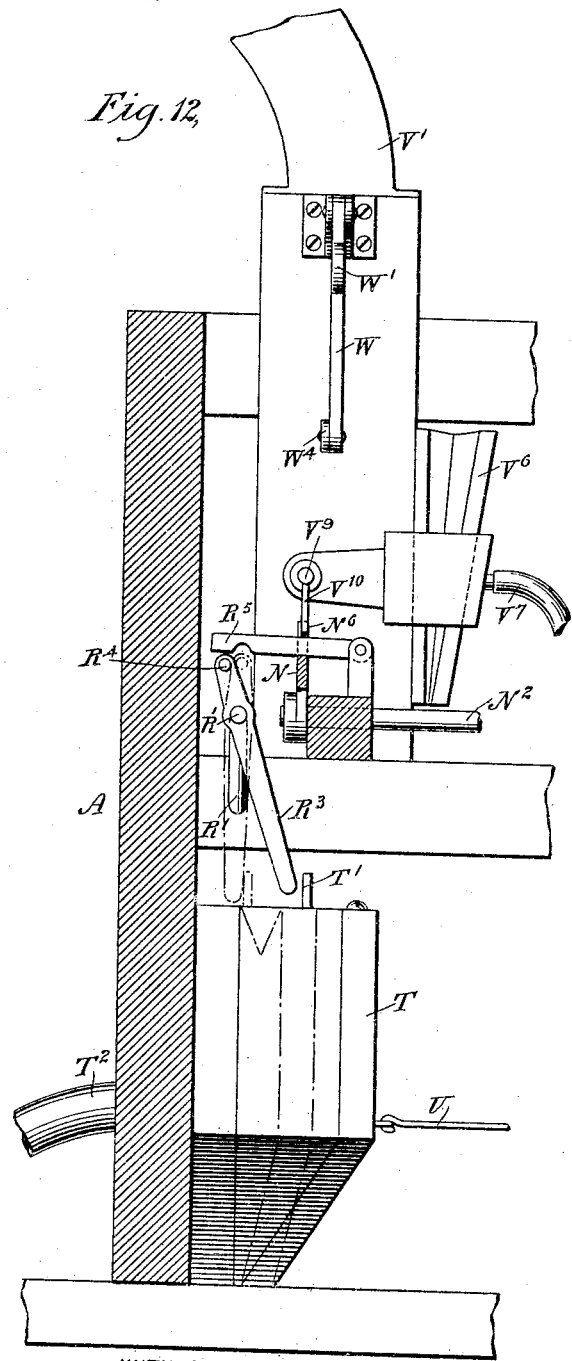
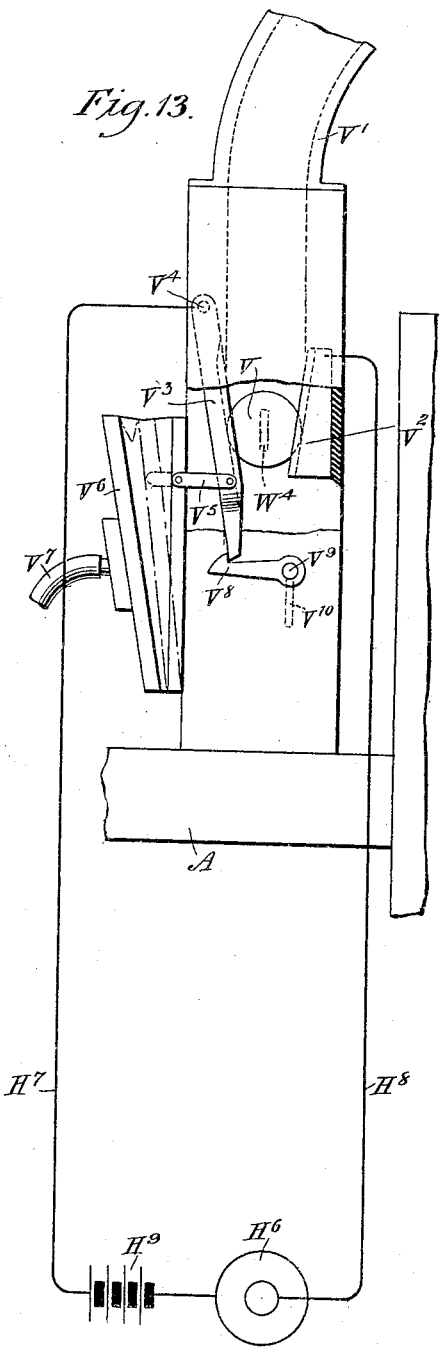

No. 769,671. PATENTED SEPT. 6, 1904.
W. R. VERSTRAELEN & C. ALTER.
SELF PLAYING ZITHER.
APPLICATION FILED SEPT. 3, 1903.
NO MODEL. 12 SHEETS—SHEET 10.
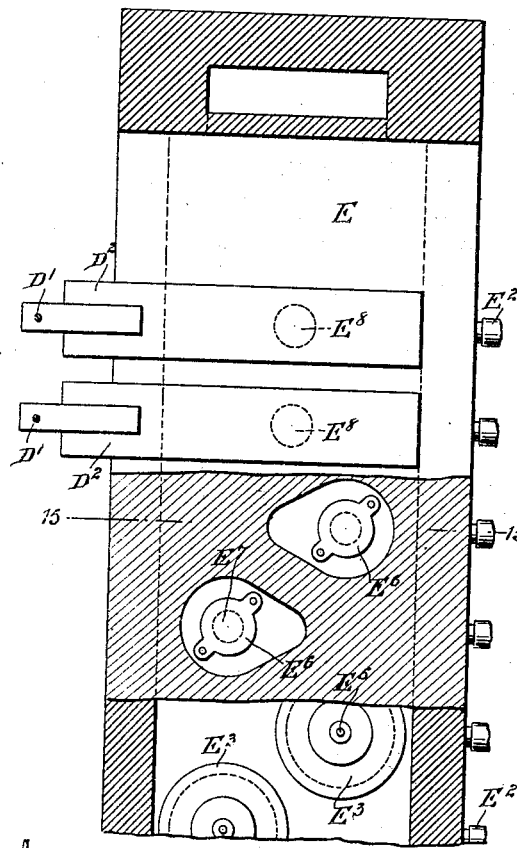
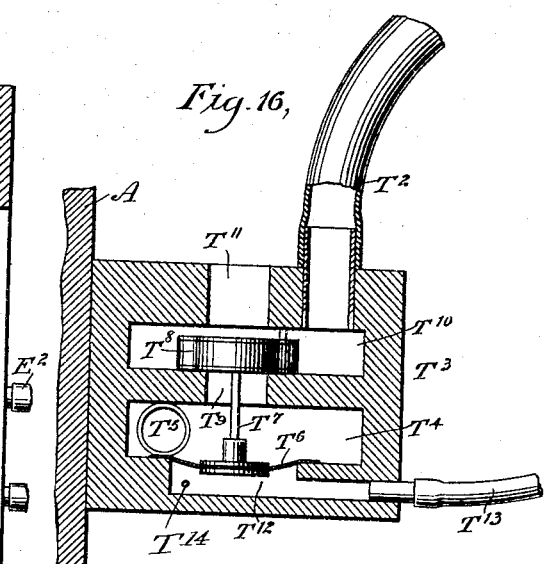
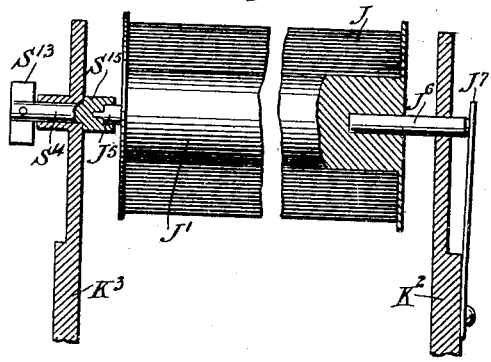
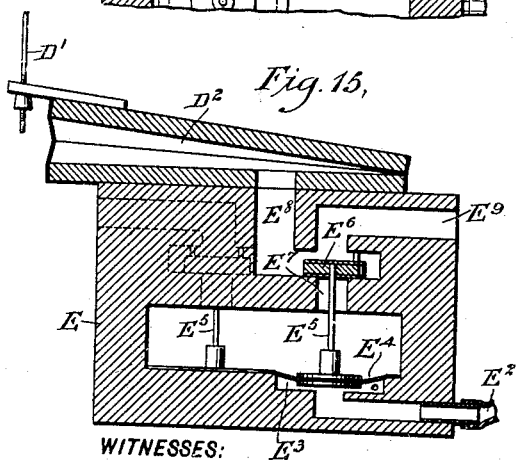
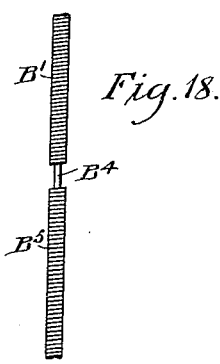
WITNESSES:
Edward Thorpe
INVENTORS
William R. Verstraelen
Christian Alter
BY
ATTORNEYS No. 769,671. PATENTED SEPT. 6, 1904.
W. R. VERSTRAELEN & C. ALTER.
SELF PLAYING ZITHER.
APPLICATION FILED SEPT. 3, 1903.
NO MODEL. 12 SHEETS—SHEET 11.
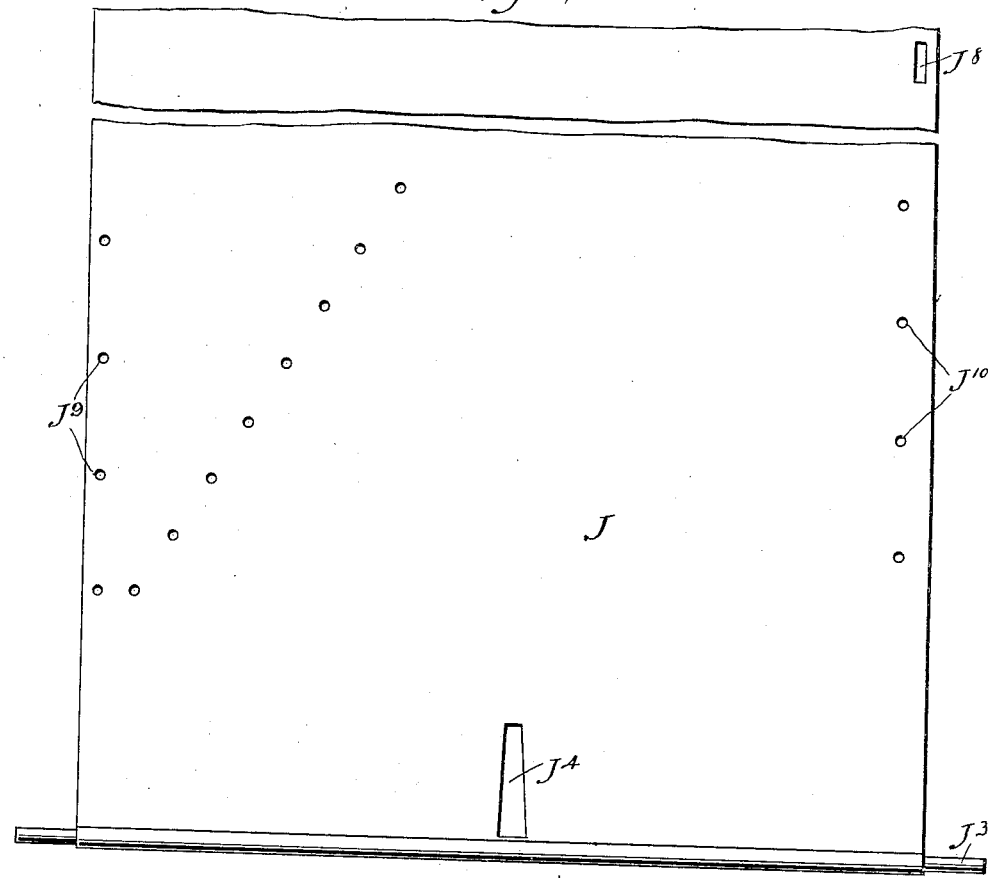
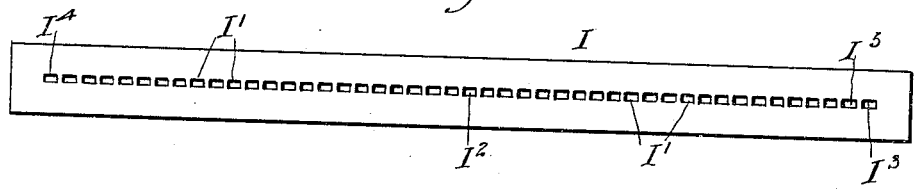
WITNESSES:
Edward Thorpe
Rev. G. Hoster
INVENTORS
William R. Verstraelen
Christian Alter
BY
Munn
ATTORNEYS No. 769,671. Patented September 6, 1904.

UNITED STATES PATENT OFFICE.

WILLIAM R. VERSTRAELEN AND CHRISTIAN ALTER, OF NEW YORK, N. Y.

SELF-PLAYING ZITHER.

SPECIFICATION forming part of Letters Patent No. 769,671, dated September 6, 1904.

Application filed September 3, 1903. Serial No. 171,752. (No model.)

*To all whom it may concern:*

Be it known that we, WILLIAM R. VERSTRAELEN and CHRISTIAN ALTER, both citizens of the United States, and residents of the city of New York, borough of Manhattan, in the county and State of New York, have invented a new and Improved Self-Playing Zither, of which the following is a full, clear, and exact description.

The invention relates to stringed musical instruments having a coin-controlled motor and automatic picking devices for picking the strings.

The object of the invention is to provide a new and improved self-playing zither arranged to permit the use of a number of selected rolls of note-sheets on a single carrier, whereby any one of the note-sheets may be brought into operative position and unwound over a tracker-board to cause picking of the strings, according to the notation of this operative note-sheet, and to automatically rewind the operative note-sheet after the tune is played to allow resetting by the operator of the roll-carrier for another tune, if desired.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
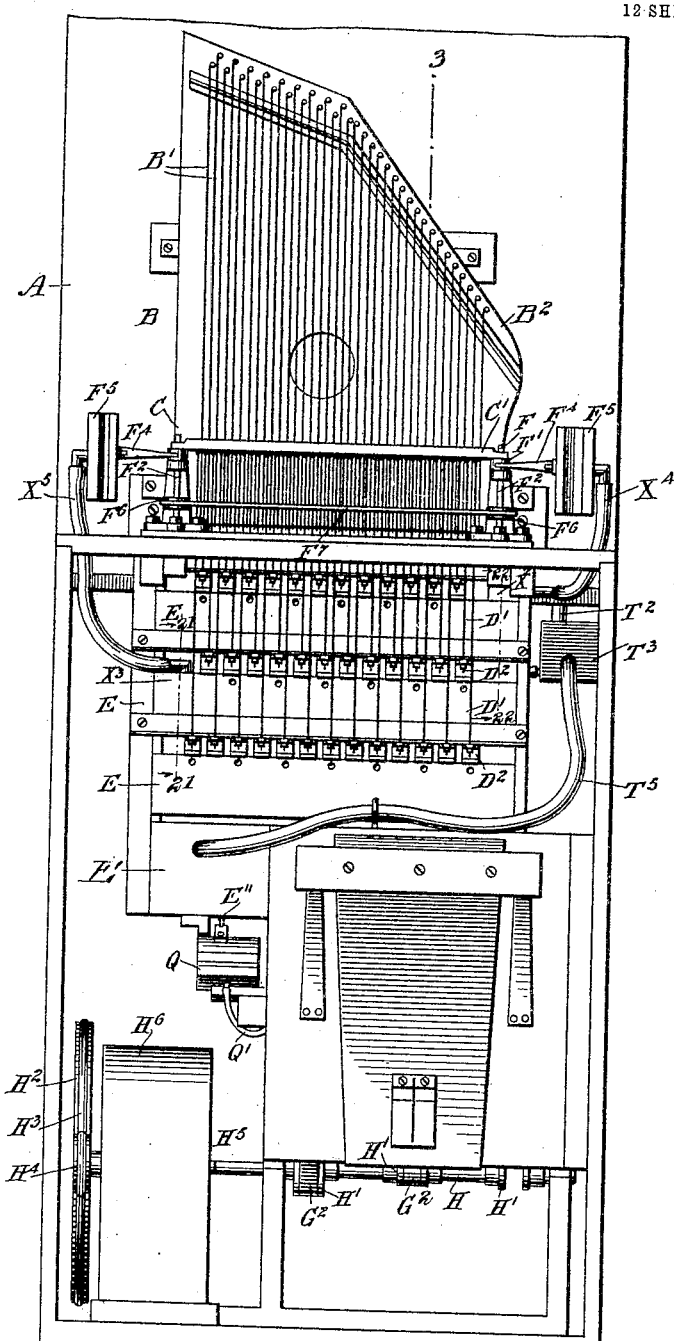
Figure 21:
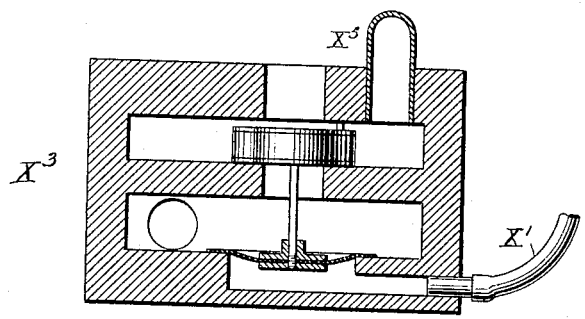
Figure 22:
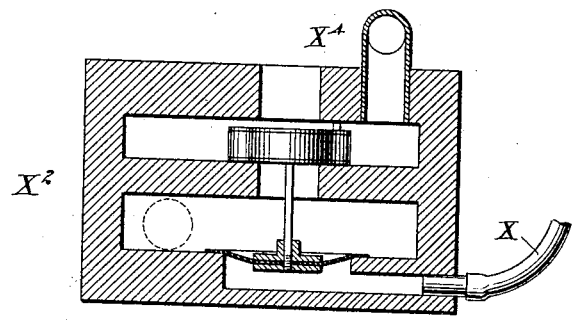

Figure 1 is a front elevation of the improvement, part of the casing being removed. Fig. 2 is a rear elevation of the same, part of the casing being removed. Fig. 3 is a transverse section of the same on the line 3 3 of Fig. 1. Fig. 4 is an enlarged sectional plan view of the string-picking device. Fig. 5 is a like view of the same with the parts in a different position. Fig. 6 is an enlarged sectional front elevation of the pickers and levers for imparting a swinging motion to the same. Fig. 7 is an enlarged rear side elevation of the bellows or main wind-chest, the action wind-chest, and the mechanism for connecting and disconnecting the wind-chests with and from each other, parts being in section. Fig. 8 is a transverse section of the same on the line 8 8 of Fig. 7. Fig. 9 is an enlarged rear side elevation of the improvement, showing more particularly the tracker-board, the roll-carrier, and the unwinding and rewinding devices. Fig. 10 is a transverse section of the same on the line 10 10 of Fig. 9. Fig. 11 is a similar view of the same on the line 11 11 of Fig. 9. Fig. 12 is an enlarged rear elevation of the coin-controlled starting mechanism, parts being in section. Fig. 13 is a front elevation of the same, parts being broken out. Fig. 14 is an enlarged plan view of the action wind-chest and the pneumatics for operating the pickers, parts being in section. Fig. 15 is a cross-section of the same on the line 15 15 of Fig. 14. Fig. 16 is a cross-section of one of the valved wind-chests for operating the re-rolling device. Fig. 17 is an enlarged sectional elevation of one of the note-sheet spools and its mounting in the note-sheet carrier. Fig. 18 is a side elevation of part of one of the bass-strings of the instrument. Fig. 19 is a face view of one of the note-sheets. Fig. 20 is a like view of the tracker-board; and Figs. 21 and 22 are sectional views of the pneumatic valves, taken on the lines 21 21 and 22 22 of Fig. 1.

On a suitably-constructed stand or other support A is held a zither or similar musical instrument B, having the usual strings B' stretched over a resonating-board $B^2$, preferably disposed vertically on the front of the support A, as plainly shown in the drawings. The strings B' are adapted to be picked by a picking device C (shown in detail in Figs. 4, 5, and 6) and provided with a picker bar or frame C', extending transversely of the strings B' in front of the same, and on the top of the said picker-bar C' are fulcrumed at $C^2$ horizontally-disposed pickers $C^3$, one for each string B', the said pickers standing approximately at right angles to the strings, as shown in Figs. 4 and 5. Each picker $C^3$ is provided at its free end with an angular arm or lug $C^4$, adapted to engage the string at the rear side thereof to pick the string on swinging the picker-bar C' forwardly, as hereinafter more fully described. Each picker $C^3$ is pressed by a spring $C^5$ against a stop $C^6$, preferably made of felt and secured to the top of the picker-bar $C'$, as shown in Fig. 6, so that the lug $C^4$ of the picker-bar normally stands out of transverse alinement with its string $B'$ to allow the said lug $C^4$ to pass between adjacent strings from the front of the same to the rear thereof, as will be readily understood by a comparison of Figs. 5 and 4. When the picker-bar $C'$ is swung rearwardly, then the desired picker $C^3$ receives a swinging motion from the right to the left to bring its lug $C^4$ in alinement with its string, so that on the next forward swinging motion of the picker-bar $C'$ the string is sounded by the lug $C^4$. Now in order to impart this swinging motion to a picker $C^3$ at the time the latter is in a rearmost position, as shown in Fig. 4, a bell-crank lever D is provided for each picker, the bell-crank lever being fulcrumed on the picker-bar $C'$, and its upper member engages the right-hand side of the picker between the fulcrum $C^2$ thereof and the stop $C^6$, as plainly shown in Figs. 4 and 5. The other member of each picker D is pivotally connected by a link $D'$ with the movable part of a pneumatic $D^2$, connected with an action wind-chest E, so that when this pneumatic is collapsed, as hereinafter more fully described, then a swinging motion is given by the corresponding link $D'$ to the picker-lever D to impart a swinging motion to the picker $C^3$ for swinging the lug $C^4$ in alinement with the string to insure subsequent sounding thereof on the forward or outward swinging motion of the picker-bar $C'$. A swinging motion in a horizontal plane is given to the picker-bar $C'$, and for this purpose the ends of the picker-bar $C'$ are mounted on the crank-pins F of crank-disks $F'$, secured on rock-shafts $F^2$, disposed vertically and journaled in suitable bearings $A'$, carried on the main stand A. The crank-disks $F'$ are provided with wrist-pins $F^3$, pivotally connected by links $F^4$ with pneumatics $F^5$, adapted to alternately collapse and open, as hereinafter more fully described, so as to impart a rocking motion to the said crank-shafts $F^2$ for the crank-disks $F'$ and crank-pins F to impart the desired swinging motion to the picker-bar $C'$. In order to insure a uniform motion of the rock-shafts $F^2$, the latter are provided with pulleys $F^6$, (see Fig. 1,) connected with each other by a band $F^7$, so that the rocking motion given to one shaft by its pneumatic $F^5$ and link $F^4$ is transmitted to the other rock-shaft in case the latter's pneumatic does not act properly. In order to hold the connected rock-shafts and the picker-bar $C'$ in either of their two end positions, a link $F^8$ is provided, pivotally connected with one of the pulleys $F^6$ and with the free end of a spring $F^9$, attached to a bracket $A^2$ on the stand A, as plainly indicated in Figs. 4 and 5.

The action wind-chest E is preferably made in connected sections arranged in tiers, as shown in Figs 1 and 3; but such arrangement is not essential, and the lower end of the action wind-chest E is adapted to be connected and disconnected by a valve $E'$ with and from the main wind-chest G of usual construction, (see Figs. 3 and 7,) from which main wind-chest the air is exhausted by bellows $G'$, connected by a pitman $G^2$ with the crank-arms $H'$ of a counter-shaft H, journaled in the lower portion of the stand A and provided with a pulley $H^2$, connected by a belt $H^3$ with a pulley $H^4$, journaled on the main shaft $H^5$ of a motor $H^6$, preferably of the electric type, so that when the motor is running a rotary motion is given to the counter-shaft H, which, by the crank-arms $H'$ and pitman $H^2$, actuates the bellows $G'$ to exhaust the air from the main wind-chest G. Now when the valve $E'$ is opened air is exhausted from the action wind-chest E for collapsing the pneumatics $D^2$ as the notations of the note-sheets call for, as hereinafter more fully explained.

The sections of the action wind-chest E are connected by flexible tubes $E^2$ with the usual openings $I'$ in a tracker-board I, over which is adapted to travel a note-sheet J, unwinding from a spool $J'$ on a note-sheet carrier K and winding up on a winding-up roller L, adapted to be driven from the counter-shaft H of the motor $H^6$. The note-sheet carrier K is adapted to carry a plurality of rolls of note-sheets, (see Figs. 9, 10, and 11,) and the said carrier is adapted to be turned by the operator to bring the desired note-sheet into a lowermost operative position. For this purpose the carrier is provided with a shaft $K'$, journaled in suitable bearings attached to brackets $A^3$ $A^4$, forming part of the stand A, and on the said shaft $K'$ are secured spaced flanges $K^2 K^3$, in which the spools $J'$ are journaled, as hereinafter more fully explained. One end of the shaft $K'$ extends to the outside of the stand A, and on the outer end of the shaft is secured a wheel $K^4$, adapted to be taken hold of by the operator for turning the carrier, and on the face of the said wheel is arranged a graduation on which indicates a pointer $K^5$, fixed on the stand A. Now the spools $J'$ and their note-sheet rolls are arranged in a circle on the carrier K and spaced equidistant apart, and the graduation on the outer face of the wheel $K^4$ indicates the position of the said note-sheet rolls, so that when the operator turns the hand-wheel $K^4$ the pointer $K^5$ indicates when the desired note-sheet roll is in a lowermost operative position. Each note-sheet J is preferably made of paper or like flexible material and is provided with the usual apertures representing the notation of the piece of music, the said openings being adapted to register with corresponding openings $I'$ in the tracker-board I. Now when this takes place air passes through the corresponding tracker-board openings $I'$ and tube $E^2$ into a chamber $E^3$, (see Figs. 14 and 15,)

over which extends a diaphragm $E^4$, the top face of which is within the action wind-chest E, so that the air passing into this chamber $E^3$ causes the diaphragm $E^4$ to swing upward and in doing so lift a valve-stem $E^5$ and valve $E^6$ to connect the interior of the wind-chest E by ports $E^7$ and $E^8$ with the corresponding pneumatic $E^2$ to collapse the same by exhausting the air therefrom. When this takes place, the corresponding picker $C^3$ is actuated, as previously described, to sound the corresponding string. As soon as the tracker-board opening is again covered by the note-sheet then the valve $E^6$ moves back to its former position—that is, closes the port $E^7$ and connects the port $E^8$ with the atmosphere—so that the pneumatic $D^2$ opens or expands by the action of its usual spring, and consequently the lever D is moved into its normal position to allow the spring $C^5$ to swing the picker $C^3$ back against its stop $C^6$. The chamber $E^3$ is provided with a leak-aperture $E^9$ to allow escape of air from the chamber and return of the diaphragm $E^4$.

It is understood that the above-described mechanism for actuating the pneumatic $D^2$ from the tracker-board by the note-sheet and the action wind-chest E is alike for each pneumatic.

When a note-sheet roll J is in a lowermost position, its outer end is then to be connected with the winding-up roller L and passed over the tracker-board I, and for this purpose the following construction is provided: On the outer end of each note-sheet is secured a bar $J^3$, extending beyond the sides of the note-sheet and normally resting at the projecting ends in radial slots $K^6$, formed in the flanges $K^2$ $K^3$ of the carrier K. (See Figs. 9, 10, and 11.) Springs $K^7$ on the flanges $K^2$ $K^3$ engage the projecting ends of the bar $J^3$ to hold the same against accidental displacement in the flanges, but to allow the bar $J^3$ to be pushed radially out of the slots $K^6$. The terminals of the bar $J^3$ of each note-sheet project beyond the outer faces of the flanges $K^2$ $K^3$ to be engaged at the top by lugs $N'$, formed on the free ends of arms N N, secured on a rock-shaft $N^2$, journaled in suitable bearings in the stand A and provided with an arm $N^3$, supporting a weight $N^4$, for normally holding the arms N in an uppermost position—that is, with the lugs $N'$ above the terminals of the bar $J^3$ of the note-sheet then in a lowermost position. On the shaft $N^2$ is also secured a depending arm $N^5$, (see Figs. 10 and 11,) adapted to be engaged by a catch O, fulcrumed on the movable member of a pneumatic $O'$, attached to the stand A and connected by a flexible tube $O^2$ with the main wind-chest G, so that when the air is exhausted from the latter on starting the motor then air is also exhausted from the pneumatic $O'$ to cause the same to collapse for the catch O to impart a swinging motion to the arm $N^5$ to rock the shaft $N^2$, so that the arms N swing downward and by their lugs $N'$ push the bar $J^3$ downward out of the slots $K^6$ to partly unwind the note-sheet from its spool $J'$ and to draw the end of the note-sheet over the tracker-board I. The terminals of the bar $J^3$ after leaving the slots $K^6$ pass into guideways $A^5$, formed in fixed plates $A^6$, attached to the stand A, and the lower ends of the guideways $A^5$ are adjacent to flanges $L'$, formed on the winding-up roller L. The flanges $L'$ are provided with peripheral hooks $L^2$, adapted to engage the terminals of the bar $J^3$, moved by the arms N downward, so that the bar $J^3$ is moved into a longitudinal recess $L^3$, formed lengthwise in the peripheral surface of the winding-up roller L. As the latter rotates as soon as the motor is started and at the time the bar $J^3$ is moved downward by the arms N, as described, it is evident that the hooks $L^2$ in engaging the terminals of the bar $J^3$ carry the latter along, so as to wind the end of the note-sheet on the winding-up roller L. As shown in Fig. 11, two such hooks $L^2$ are provided, standing diametrically opposite each other, and the arrangement is such that when the machine is at a standstill one of the hooks $L^2$ is in front of the guideway $A^5$ to readily engage the bar $J^3$ when the latter is moved down to the lower end of the guideway onto the inclined face $L^4$, formed on the flange $L'$ and leading to the recess $L^3$. A roller $L^5$ is journaled in the lower part of the plates $A^6$ to properly guide the note-sheet when rewinding it on the spool J. When the arms N have moved the bar $J^3$ into engagement with the hooks $L^2$, then the catch O releases and disengages the arm $N^5$, so as to allow the weight $N^4$ to rock the shaft $N^2$ in a reverse direction for the arms N to swing upward. For the purpose mentioned the catch O is provided with an upwardly-extending lug $O^3$, adapted to move in engagement with a plate $O^4$, fixed on the stand A, so that when the pneumatic $O'$ is collapsed and the bar $J^3$ has been delivered to the hooks $L^2$ then the lug $O^3$ strikes against the fixed plate $O^4$ to impart a downward swinging motion to the catch O to disengage the latter from the arm $N^5$, thus allowing the shaft $N^2$ to rock by the action of its weight $N^4$ for the purpose described. A spring $O^5$ normally holds the catch O in position to engage the arm $N^5$. In order to prevent the bar $J^3$ from dropping out of the recess $L^3$ and hooks $L^2$ while passing around with the winding-up roller L, suitable spring guide-arms $A^7$ are provided, secured at one end to the stand A and extending segmentally on the outer faces of the flanges $L'$. (See Figs. 9 and 10.)

In order to drive the winding-up roller L positively from the motor for winding up the note-sheet, the following device is provided: On the shaft $L^6$ of the winding-up roller L is secured a gear-wheel $L^7$ (see Figs. 9 and 10)

in mesh with a pinion P', secured on a shaft P, mounted to turn and to slide longitudinally in the hub of a pulley P², connected by a belt P³ with a pulley P⁴ on the counter-shaft H, (see Fig. 3,) so that when the latter is rotated a rotary motion is transmitted by the said pulley P⁴, belt P³, and pulley P² to the shaft P, so that the pinion P' rotates the gear-wheel L⁷, and consequently the shaft L⁶ and the roller L, to wind up the note-sheet thereon.

The valve E' for connecting and disconnecting the action wind-chest E from the main exhaust wind-chest G is normally in a closed position, as shown in Fig. 7, and the said valve E' does not open until the operative note-sheet is connected by the mechanism above-described with the winding-up roller, and for this purpose each note-sheet J is provided at its beginning end, adjacent to the bar J³, with a slot J⁴, preferably located near the middle of the sheet, to register with a tracker-board opening I², connected by a pipe Q' with a pneumatic Q (see Figs. 7 and 8) and by a branch pipe Q² with the wind-chest G, so that during the time the slot J⁴ is in register with the tracker-board opening I² the pneumatic Q is not affected—that is, remains open by the action of its spring, and the valve E' consequently remains closed—but as soon as the end of the slot J⁴ has passed the tracker-board opening I² and closed the same then the air is drawn out of the pneumatic Q by way of the pipe Q', branch pipe Q², and main wind-chest G to collapse the said pneumatic Q to move the valve E' into an open position. For this purpose the movable member of the pneumatic Q is provided with a catch Q³, adapted to engage a pin E¹⁰ on the valve-stem E¹¹ for the valve E', so that when the pneumatic Q collapses the catch Q³ pulls the pin E¹⁰, valve-stem E¹¹, and valve E' downward for the valve to establish communication between the wind-chests G and E. The valve-stem E¹¹ is pressed on by a spring E¹² to normally hold the valve E' in an uppermost or closed position, and hence when the catch Q³ is disengaged from the pin E¹⁰ at the end of the piece of music played by the instrument then the spring E¹² forces the valve E' so as to disconnect the action wind-chest E from the main wind-chest G. A spring Q⁴, secured on the movable member of the wind-chest G, presses an arm Q⁵ on the catch Q³, so as to normally hold the latter in engagement with the pin E¹⁰.

After the tune is played—that is, the last of the note-sheet note-apertures has registered with the corresponding tracker-board opening I'—then the reversing mechanism is brought into automatic action—that is, the rotation of the winding-up roller is stopped and the shaft P is moved outward to disengage the pinion P' from the gear-wheel L⁷ to allow the shaft L⁶ to rotate loosely in its bearings, and at the same time the lowermost spool J' is coupled by an auxiliary driving mechanism with the still rotating pulley P² to rotate the said spool J', but in a reverse direction, so that the note-sheet is now rewound and unwinds from the roller L. For the purpose described the following mechanism is provided, special reference being had to Figs. 2, 9, 10, and 17: On the shaft P is secured a grooved shifting collar P⁵, engaged by one end of a shifting lever R, having its pivot or shaft R' journaled in suitable bearings carried by the stand A, and the said shifting lever R is pressed on by a spring R² to normally hold the shaft P in an innermost position—that is, to hold the pinion P' in mesh with the gear-wheel L⁷. The other forked end of the shifting lever R (see Fig. 9) engages a shifting collar S', secured on the inner end of a shaft S, mounted to slide in and to turn with the hub S² of a gear-wheel S³, having its said hub S² journaled in suitable bearings carried on the stand A. The gear-wheel S³ is in mesh with a gear-wheel S⁴, mounted to rotate loosely on a stud S⁵, carried by the stand A, and on the said gear-wheel S⁴ is secured a grooved pulley S⁶, connected by a belt S⁷ with a grooved pulley S⁸, mounted to rotate loosely on the hub P⁶ of the grooved pulley P². On the outer face of the pulley S⁸ are secured lugs S⁹, one of which is adapted to be engaged at a time by a clutch-pin S¹⁰, mounted to slide transversely in the web of the grooved pulley P², and the outer end of the said clutch-pin S¹⁰ is engaged by one end of a lever S¹¹, fulcrumed at or near its middle on the outer face of the pulley P², and the said lever S¹¹ is connected with the outer end of the shaft P, so that when a swinging motion is given to the lever R to move the shaft P outward then the latter imparts a swinging motion to the lever S¹¹ for the latter to push the clutch-pin S¹⁰ inward in engagement with one of the lugs S⁹. As the pulley P² is still rotating it is evident that the pulley S⁸ is carried around with the pulley P², owing to the pin S¹⁰ engaging a lug S⁹, and the rotary motion of this pulley S⁸ is transmitted by the belt S⁷, pulley S⁶, and gear-wheels S⁴ and S³ to the shaft S, which is moved inward by the action of the lever R at the time the shaft P is moved outward, as above described. On the inner face of the shifting collar S' is secured a crank-pin S¹², adapted to engage a wing S¹³ on a shaft S¹⁴, (see Fig. 17,) journaled in suitable bearings in the flange K³ of the carrier, the said shaft S¹⁴ being provided at its inner end with a socket S¹⁵, adapted to be engaged by the polygonal end of the trunnion J⁵ of the spool J', then in a lowermost position, the other trunnion, J⁶, of the said spool being journaled loosely in a bearing carried by the flange K². A spring J⁷ presses on the outer end of the shaft J⁶ to hold the trunnion J⁵ in engagement with the socket S¹⁵, so that when the shaft S¹⁴ is rotated the rotary motion is given to the spool J' to rewind the note-sheet thereon. It is understood that the shaft S is in axial alinement with the axis of the spool J' at the time in a lowermost position, so that when the shaft S is shifted inwardly and rotated from the pulley P², as described, then the crank-pin S¹² engages the wing S¹³ and rotates the shaft S¹⁴ for rotating the spool to rewind the note-sheet, as mentioned. In order to rock the shaft R' of the lever R at the proper time, the said shaft R' is provided with an arm R³, (see Figs. 10 and 12,) extending with its lower end into the path of a lug T', secured on the movable member of a reversing-pneumatic T, attached to the stand A. The pneumatic T is connected by a tube T² with a pneumatic valve T³, (see Fig. 16,) the said valve T³ having an exhaust-chamber T⁴ connected by a tube T⁵ with the action wind-chest E. (See Fig. 7.) In the bottom of the chamber T⁴ is arranged a diaphragm T⁶, carrying the valve-stem T⁷ of a valve T⁸, adapted to open and close a port T⁹ for connecting the chamber T⁴ with a chamber T¹⁰, into which opens the tube T². A port T¹¹ leads from the chamber T¹⁰ to the outer air, as plainly indicated in Fig. 16. The under side of the diaphragm T⁶ extends over a chamber T¹², provided with a leak-opening T¹⁴ and connected by a tube T¹³ with a tracker-board opening I³, adapted to be uncovered by a slot J⁸, formed in the note-sheet near the end thereof, so that when this slot J⁸ uncovers the said tracker-board opening I³ air passes through the latter and tube T¹³ into the chamber T¹² to cause the diaphragm T⁶ to move upward, so as to move the valve T⁸ off its seat over the port T⁹ to connect the chambers T⁴ and T¹⁰ with each other and to close the port T¹¹. Now when this takes place air is exhausted by way of the tube T² from the reversing-pneumatic T to cause the latter to collapse and in doing so cause the lug T' to impart a swinging motion to the arm R³ to rock the shaft R' of the lever R, as previously described, to throw the pinion P' out of mesh with the gear-wheel L⁷ and to throw the crank-pin S¹² in engagement with the wing S¹³ of the lowermost spool, so that the spool is positively turned to wind up the note-sheet unwinding now from the roller L. The reversing-pneumatic T also controls the tripping mechanism for the catch Q³, (shown in Figs. 7 and 8 and previously mentioned,) and for this purpose the following device is provided: To the movable member of the reversing-pneumatic T is attached one end of a link U, (see Fig. 2,) connected at its other end with a bell-crank lever U', fulcrumed on the stand A, and the said bell-crank lever U' is connected by a link U² (see Figs. 7 and 8) with a bell-crank lever U³, fulcrumed on the frame for the chests G and E, and the said bell-crank lever U³ is provided at its free end with a pin U⁴, adapted to engage the tailpiece Q⁶ of the catch Q³ at the time the pneumatic Q is collapsed and the valve E' is open, so that a swinging motion is given by the bell-crank lever U³ to the catch Q³ to disengage the latter from the pin E¹⁰ to allow the spring E¹² to close the valve E', as previously mentioned—that is, at the time the tune has been played—so that the action wind-chest E is disconnected from the main wind-chest G during the rewinding of the note-sheet, as previously explained. It is expressly understood that the valve E' is open while the note-apertures of the note-sheet pass over the tracker-board; but when the last note-aperture has passed its corresponding tracker-board aperture I' then the slot J⁸ uncovers the aperture I³ to cause a collapsing of the reversing-pneumatic T, as previously explained, to set the reversing mechanism in action and to cause closing of the valve E' for the purpose mentioned. In order to hold the reversing mechanism in an active position, the arm R³ is extended above the shaft R', (see Fig. 10,) and this end of the arm carries a pin R⁴, adapted to be engaged by the notch of a locking-pawl R⁵, fulcrumed on the stand A, the said notch dropping into the pin R⁴ at the time the lever R³ reaches the end of its swinging motion given by the lug T' of the reversing-pneumatic T.

The motor H⁶ is started by closing the circuit through the medium of a coin V, placed by the operator in a coin-chute V', having its mouth extending to the outside of the stand A. The lower end of the coin-chute V' (see Figs. 12 and 13) is provided with a coin-retainer in the form of a fixed member V² and a movable member V³, inclined toward each other, to hold the coin rolling down the chute between the members, as plainly indicated in Fig. 13. When this takes place, the circuit is closed, as the members V² and V³ are connected by circuit-wires H⁷ H⁸ with the motor H⁶, one of the wires containing a source of electrical energy H⁹, as shown in the said Fig. 13. Now when the circuit is closed the motor H⁶ is started. The member V³ of the coin-retainer is in the form of an arm, fulcrumed at its upper end at V⁴ on the coin-chute and pivotally connected by a link V⁵ with the movable member of a pneumatic V⁶, held on the coin-chute and connected by a tube V⁷ with the tube O², previously mentioned, (see Fig. 10,) and leading from the pneumatic O' to the main wind-chest G, as illustrated in Fig. 2. The free lower end of the movable member V³ is engaged by a catch V⁸ to hold the said member against swinging to one side at the time the motor is started, and air is drawn from the pneumatic V⁶ by the tubes V⁷, O², and wind-chest G. The catch V⁸ is secured on the end of a transverse shaft V⁹, journaled in suitable bearings on the stand A, (see Fig. 10,) and on the rear end of the said shaft V⁹ is secured a depending pin V¹⁰, adapted to be engaged by a cam-arm N⁶ on one of the arms N, employed for carrying the bar J³ of a note-sheet to the winding-up roller, as previously explained. Now when the arms N swing back into a final uppermost position the cam $N^6$ engages the arm $V^{10}$ to impart a rocking motion to the shaft $V^9$, so that the catch $V^8$ releases the movable member $V^3$ to allow the pneumatic $V^6$ to collapse, and thereby swing the movable member $V^3$ into an open position—that is, away from the fixed member $V^2$—to allow the coin to drop. At the time this takes place one of the arms N, which extends under the catch $R^5$, raises the latter to swing the catch out of engagement with the pin $R^4$ to allow the spring $R^2$ of the lever R to return the latter to its normal position—that is, to set the reversing mechanism out of action.

From the foregoing it will be seen that the coin V is held between the members $V^2$ and $V^3$ until after the note-sheet is rewound on its roll, and while the coin is in this position it forms an abutment for a locking device to prevent accidental turning of the carrier K. For the purpose described the flange $K^3$ of the carrier K is provided in its peripheral surface with notches $K^8$, (see Fig. 10,) one of which is adapted to be engaged at a time by a lug W′ on a locking-lever W, fulcrumed at its upper end at $W^2$ on a bracket secured to the coin-chute V′. A spring $W^3$ presses the lever W to hold the lug W′ in engagement with a notch $K^8$, and the lower free end of the said lever W is pivotally connected with an arm $W^4$, mounted to slide in a bearing in the coin-chute to abut against the coin V, as will be readily understood by reference to Figs. 10 and 13. Now as long as the coin is in position in the coin-retainer the lever W is locked in place, and hence the operator cannot turn the carrier K and wheel $K^4$—that is, during the time the coin is in position the note-sheet carrier K is locked against turning and only becomes unlocked when the coin V is allowed to drop on allowing the movable member $V^3$ to swing into an open position on the collapsing of the pneumatic $V^6$.

In order to allow the pneumatics $F^5$ $F^5$, employed for imparting a swinging motion to the picker-bar C′, to alternately collapse and expand, the following device is provided: On the sides of the note-sheet J are formed rows of apertures $J^9$ $J^{10}$, arranged to register alternately with the tracker-board openings $I^4$ $I^5$, (see Fig. 20,) connected by flexible tubes X X′ with pneumatic valves $X^2$ $X^3$, (shown in Fig. 1,) connected with the action wind-chest E and with the pneumatics $F^5$ $F^5$. The valve $X^2$ is in box form and is secured to the top of the chest E, while the valve $X^3$ is a box incorporated or formed in the wind-chest E. These valves may, however, be otherwise supported. The valves $X^2$ $X^3$ are connected by tubes $X^4$ $X^5$ with the pneumatics $F^5$ $F^5$, and, as shown in Figs. 21 and 22, the said valves are of the same internal construction as the valve $T^3$, Fig. 16, so that further detail description of the same is not deemed necessary.

Now when a tracker-board opening $I^4$ or $I^5$ is uncovered by the corresponding note-sheet aperture $J^9$ or $J^{10}$ then air passes into the pneumatic-valve $X^2$ or $X^3$ to connect the corresponding pneumatic $F^5$ with the action wind-chest to collapse the pneumatic, and when the note-sheet aperture $J^9$ or $J^{10}$ has passed its tracker-board opening $I^4$ or $I^5$ the collapsed pneumatic $F^5$ expands by the action of its spring. The note-sheet apertures $J^9$ $J^{10}$ are staggered and spaced equal to the note-apertures of the note-sheet, so that for each note-aperture registering with a tracker-board opening I′ one of the apertures $J^9$ or $J^{10}$ registers with its tracker-board opening $I^4$ or $I^5$, and hence a swinging motion is given to the picker-bar C′ for each note-aperture of each transverse row of note-apertures on the note-sheet.

In order to insure proper picking of the heavy or bass strings having a core $B^4$ and a wire covering $B^5$, (see Fig. 18,) a portion of the covering $B^5$ is removed for the lug $C^4$ of a corresponding picker to engage the core in picking the string.

The operation is as follows: The operator first turns the hand-wheel $K^4$ until the pointer $K^5$ indicates the desired piece of music to be played on the zither B, and by turning the hand-wheel $K^4$ the note-sheet carrier K is revolved until a note-sheet containing the notation representing the desired music is in a lowermost position—that is, above the tracker-board I. As soon as the operator has set the hand-wheel $K^4$ as described a coin—say a nickel—is passed into the coin-chute V′, and this coin in dropping between the members $V^2$ and $V^3$ closes the electric circuit, which starts the motor $H^6$, and as the coin now forms an abutment for the arm $W^4$ the note-sheet carrier is locked against rotation, as previously explained. The motor now actuates the bellows G′ to exhaust the air from the main wind-chest G, and the wind-chest G by the tube $O^2$ exhausts the air from the pneumatic O′ for actuating the arms N to carry the bar $J^3$ of the lowermost operative note-sheet downward into engagement with the hooks $L^2$ of the winding-up roller L, driven as soon as the motor starts running, so that the winding-up roller begins to wind up the note-sheet. As soon as this takes place the catch O releases the arm $N^5$ and the arms N swing partly back—that is, into a counterbalanced position—owing to the action of their weight $N^4$. Now while the note-sheet is being wound up the slot $J^4$ at the beginning of the note-sheet passes over the tracker-board opening $I^2$, and hence air keeps the pneumatic Q inflated, notwithstanding that the pipe Q′ is connected by the branch pipe $Q^2$ with the wind-chest G, and consequently the valve E′ is still closed. As soon as this slot $J^4$ has passed its tracker-board opening $I^2$ then air is sucked out of the pneumatic Q and the latter collapses and its catch $Q^3$ imparts a sliding motion to the valve E' to open the same to connect the main wind-chest G with the action wind-chest E. The note-apertures in the note-sheet now begin to register with the tracker-board openings I', and hence the pneumatics $D^2$ are actuated to cause the levers D to bring the pickers into active engagement at the time the picker-bar is caused to rock owing to the action of its pneumatics $F^5$. The tune is now played and when finished the slot $J^8$ registers with the tracker-board opening $I^3$ to let air into the chamber $T^{12}$ of the pneumatic-valve $T^3$ (see Fig. 16) to cause shifting of the valve $T^8$ for air to be sucked out of the reversing-pneumatic T to collapse the latter for bringing the reversing mechanism in action, as previously explained. At the same time the collapsing of the reversing-pneumatic T causes a releasing of the catch $Q^3$ to permit the valve E' to fly shut, owing to the action of the spring $E^{12}$, to disconnect the action wind-chest E from the main wind-chest G, so that the picker device comes to a standstill. The reversing mechanism now rotates the lowermost spool to wind up the note-sheet and to unwind it from the roller L. Now when the sheet is rewound on its spool its bar $J^3$ finally leaves the recess $L^3$ and passes up through the guideway $A^5$ into the slots $K^6$ of the carrier-flanges $K^2$ $K^3$, and in doing so the bar comes in contact with the lugs N' of the levers N, so as to swing the same back into a final uppermost position, whereby the catch $R^5$ is swung out of engagement with the pin $R^4$ to allow the reversing mechanism to return to its former position, owing to the action of the spring $R^2$, and at the same time the cam $N^6$ engages the pin $V^{10}$ to rock the shaft $V^9$ for the catch $V^8$ to release the movable member $V^3$. The pneumatic $V^6$ now swings the movable member $V^3$ outward to allow the coin V to drop—that is, move out of engagement with the members $V^2$ and $V^3$—to break the circuit, and hence to cause the motor $H^6$ to stop, and at the same time the coin dropping away from the members $V^2$ and $V^3$ moves out of the path of the bar $W^4$ to unlock the lever W, and hence allow resetting of the note-sheet carrier K whenever it is desired to do so.

By the arrangement described a large number of note-sheets can be accommodated on the carrier to provide a large repertoire for the instrument, and the note-sheets may be of any desired length to allow of rendering long pieces of music. Furthermore, the note-sheets on one carrier may be of different lengths, as the motor keeps in action until the slot $J^8$ registers with its tracker-board opening. It is understood that the slot $J^8$ is located at a distance from the end of the note-sheet to provide a sufficient blank length of the note-sheet between the tracker-board and the spool on which the end is secured. Any one of the spools J' and its note-sheet roll can be readily removed from the carrier and replaced by another whenever desired.

Having thus described our invention, we claim as new and desire to secure by Letters Patent—

1. A self-playing stringed musical instrument, comprising in combination the following elements: a picking-frame carrying pickers and mounted to swing toward and from the strings, pneumatically-controlled devices for imparting motion to the pickers on the said frame, a tracker-board for the said devices, and means for moving a note-sheet over the said tracker-board, as set forth.

2. A self-playing stringed musical instrument, provided with a pneumatically-controlled picking device for the strings, a roll-carrier for carrying a plurality of note-sheet rolls, a winding-up roller for winding a note-sheet up, a tracker-board over which passes the note-sheet from the carrier to the winding-up roller, and means for automatically carrying one end of the note-sheet to the said winding-up roller, for the latter to wind up the sheet, as set forth.

3. A self-playing stringed musical instrument, provided with a pneumatically-controlled picking device for the strings, a roll-carrier for carrying a plurality of note-sheet rolls, a winding-up roller for winding a note-sheet up, a tracker-board over which passes the note-sheet from the carrier to the winding-up roller, and means for automatically carrying one end of the note-sheet to the said winding-up roller, the latter having means for engaging the said note-sheet end, to hold and wind up the note-sheet, as set forth.

4. A self-playing stringed musical instrument, provided with a main wind-chest, an action wind-chest, a valve for connecting and disconnecting the said wind-chests, a manually-controlled revoluble note-sheet carrier, a driven winding-up roller for winding up one of the note-sheets at a time, a tracker-board connected with the said action wind-chest and lying between the said carrier and the winding-up roller, for the active note-sheet to pass over the tracker-board, swinging arms for engaging the outer end of the active note-sheet, to move the said end in engagement with the winding-up roller, and a pneumatic connected with the said main wind-chest and having a connection with the said arms, to impart a swinging motion thereto, as set forth.

5. A self-playing stringed musical instrument, provided with a main wind-chest, an action wind-chest, a valve for connecting and disconnecting the said wind-chests, a manually-controlled revoluble note-sheet carrier, a driven winding-up roller for winding up one of the note-sheets at a time, a tracker-board connected with the said action wind-chest and lying between the said carrier and the winding-up roller, for the active note-sheet to pass over the tracker-board, swinging-arms for engaging the outer end of the active note-sheet, to move the said end in engagement with the winding-up roller, a pneumatic connected with the said main wind-chest and having a connection with the said arms, to impart a swinging motion thereto, and a tripping device for disconnecting the pneumatic and arms, for the latter to return, as set forth.

6. A self-playing stringed musical instrument, provided with a main wind-chest, an action wind-chest, a valve for connecting and disconnecting the said wind-chests, a manually-controlled revoluble note-sheet carrier, a driven winding-up roller for winding up one of the note-sheets at a time, a tracker-board connected with the said action wind-chest and lying between the said carrier and the winding-up roller, for the active note-sheet to pass over the tracker-board, swinging arms for engaging the outer end of the active note-sheet, to move the said end in engagement with the winding-up roller, a pneumatic connected with the said main wind-chest and having a connection with the said arms, to impart a swinging motion thereto, and a second pneumatic for opening the said wind-chest valve, connected with a tracker-board opening controlled by a slot in the beginning end of the note-sheet, to open the said valve after the end of the note-sheet is connected with the said winding-up roller, as set forth.

7. A self-playing stringed musical instrument, provided with a main wind-chest, an action wind-chest, a valve for connecting and disconnecting the said wind-chests, a manually-controlled revoluble note-sheet carrier, a driven winding-up roller for winding up one of the note-sheets at a time, a tracker-board connected with the said action wind-chest and lying between the said carrier and the winding-up roller, for the active note-sheet to pass over the tracker-board, swinging arms for engaging the outer end of the active note-sheet, to move the said end in engagement with the winding-up roller, a pneumatic connected with the said main wind-chest and having a connection with the said arms, to impart a swinging motion thereto, a second pneumatic for opening the said wind-chest valve, connected with a tracker-board opening controlled by a slot in the beginning end of the note-sheet, to open the said valve after the end of the note-sheet is connected with the said winding-up roller, and a picking device for the strings, pneumatically controlled from the said action wind-chest, as set forth.

8. A self-playing stringed musical instrument provided with a picking-frame, mounted to swing in front of the strings, pickers fulcrumed on the said frame and having their free ends provided with angular arms, for engaging the strings, levers fulcrumed on the frame, for imparting a swinging motion to the said pickers, pneumatics, and links for connecting the said pneumatics with the said levers, as set forth.

9. A self-playing stringed musical instrument provided with a picking-frame, mounted to swing in front of the strings, pickers fulcrumed on the said frame and having their free ends provided with angular arms, for engaging the strings, levers fulcrumed on the frame, for imparting a swinging motion to the said pickers, pneumatics, links for connecting the said pneumatics with the said levers, rock-shafts having crank-pins, on which the said frame is mounted, and pneumatics for rocking the said shafts, as set forth.

10. A self-playing stringed musical instrument provided with a picking-frame, mounted to swing in front of the strings, pickers fulcrumed on the said frame and having their free ends provided with angular arms, for engaging the strings, levers fulcrumed on the frame, for imparting a swinging motion to the said pickers, pneumatics, links for connecting the said pneumatics with the said levers, rock-shafts having crank-pins, on which the said frame is mounted, pneumatics for rocking the said shafts, and an action wind-chest for the said pneumatics, as set forth.

11. A self-playing stringed musical instrument provided with a picking-frame, mounted to swing in front of the strings, pickers fulcrumed on the said frame and having their free ends provided with angular arms, for engaging the strings, levers fulcrumed on the frame, for imparting a swinging motion to the said pickers, pneumatics, links for connecting the said pneumatics with the said levers, rock-shafts having crank-pins, on which the said frame is mounted, pneumatics for rocking the said shafts, an action wind-chest for the said pneumatics, a tracker-board over which passes the note-sheet, and valves controlled from the tracker-board, for connecting the action wind-chest with the pneumatics for the said picker-levers, as set forth.

12. A self-playing stringed musical instrument provided with a note-sheet carrier mounted to turn, a plurality of note-sheet rolls disposed in a circle and carried by said carrier, the axes of the note-sheet rolls being arranged parallel with the axis of the carrier, and a winding-up roller for the note-sheets carried by the rolls, as set forth.

13. A self-playing stringed musical instrument provided with a note-sheet carrier mounted to turn, a plurality of note-sheet rolls, disposed in a circle and carried by said carrier, the axes of the note-sheet rolls being arranged parallel with the axis of the carrier, a winding-up roller for the note-sheets on said rolls, and means, under the control of the operator, for turning the carrier to bring any one of the rolls into an operative position, as set forth.

14. A self-playing stringed musical instrument provided with a note-sheet carrier, a plurality of note-sheet rolls carried by said carrier and disposed in a circle, a single driven winding-up roller, and means for connecting the note-sheet of the roll in operative position at the time with the said winding-up roller, as set forth.

15. A self-playing musical instrument, provided with a note-sheet carrier mounted to turn, a plurality of note-sheet rolls carried by said carrier and disposed in a circle, the axes of the rolls being arranged parallel with the axis of the carrier, means under the control of the operator, for turning the carrier, to bring any one of the rolls into an operative position, means for locking the carrier against rotation after a roll is in operative position, a single driven winding-up roller, and means for connecting the note-sheet of the roll in operative position at the time with the said winding-up roller, as set forth.

16. A self-playing stringed musical instrument provided with a note-sheet carrier comprising a shaft, spaced flanges thereon, one of the flanges having openings and springs in alinement with the openings and the other flange having short spindles and means for turning the spindles, and spools for carrying the note-sheet rolls, each spool having one end of its shaft engaging an opening and spring in one flange and the other end of the shaft interlocking with the corresponding spindle, as set forth.

17. A self-playing stringed musical instrument having a revoluble note-sheet carrier, adapted to carry a plurality of note-sheet rolls arranged in a circle, a winding-up roller, a gearing for driving the said winding-up roller or the note-sheet roll in an operative position at the time, and means for throwing the said driving-gear in or out of gear with either the said winding-up roller or the said roll in operative position at the time, as set forth.

18. A self-playing stringed musical instrument having a revoluble note-sheet carrier, carrying a plurality of revoluble spools arranged in a circle, each spool being adapted to carry a note-sheet roll, a winding-up roller for winding up or unwinding a note-sheet at a time, a gear-wheel on the shaft of the said winding-up roller, a shaft mounted to slide and to turn and carrying a pinion for engagement with the said gear-wheel, a driven pulley, rotating with the said shaft, a loose pulley on the said shaft, a clutch for connecting the driven pulley with the loose pulley, a second shaft mounted to turn and to slide and adapted to engage one of the spools for rotating the same, a driving connection between the said loose pulley and the said second shaft, and a shifting-lever engaging the said shafts, for imparting sliding motion to the same in opposite directions, as set forth.

19. A self-playing stringed musical instrument having a revoluble note-sheet carrier, carrying a plurality of revoluble spools arranged in a circle, each spool being adapted to carry a note-sheet roll, a winding-up roller for winding up or unwinding a note-sheet at a time, a gear-wheel on the shaft of the said winding-up roller, a shaft mounted to slide and to turn and carrying a pinion for engagement with the said gear-wheel, a driven pulley, rotating with the said shaft, a loose pulley on the said shaft, a clutch for connecting the driven pulley with the loose pulley, a second shaft mounted to turn and to slide and adapted to engage one of the spools for rotating the same, a driving connection between the said loose pulley and the said second shaft, a shifting-lever engaging the said shafts, for imparting sliding motion to the same in opposite directions, and a reversing-pneumatic connected with the said shifting-lever, for actuating the same in one direction, as set forth.

20. A self-playing stringed musical instrument having a revoluble note-sheet carrier, carrying a plurality of revoluble spools arranged in a circle, each spool being adapted to carry a note-sheet roll, a winding-up roller for winding up or unwinding a note-sheet at a time, a gear-wheel on the shaft of the said winding-up roller, a shaft mounted to slide and to turn and carrying a pinion for engagement with the said gear-wheel, a driven pulley, rotating with the said shaft, a loose pulley on the said shaft, a clutch for connecting the driven pulley with the loose pulley, a second shaft mounted to turn and to slide and adapted to engage one of the spools for rotating the same, a driving connection between the said loose pulley and the said second shaft, a shifting-lever engaging the said shafts, for imparting sliding motion to the same in opposite directions, a reversing-pneumatic connected with the said shifting-lever, for actuating the same in one direction, and a spring for returning the said lever, as set forth.

21. A self-playing stringed musical instrument having a revoluble note-sheet carrier, carrying a plurality of revoluble spools arranged in a circle, each spool being adapted to carry a note-sheet roll, a winding-up roller for winding up or unwinding a note-sheet at a time, a gear-wheel on the shaft of the said winding-up roller, a shaft mounted to slide and to turn and carrying a pinion for engagement with the said gear-wheel, a driven pulley, rotating with the said shaft, a loose pulley on the said shaft, a clutch for connecting the driven pulley with the loose pulley, a second shaft mounted to turn and to slide and adapted to engage one of the spools for rotating the same, a driving connection between the said loose pulley and the said second shaft, a shifting-lever engaging the said shafts, for imparting sliding motion to the same in opposite directions, a reversing-pneumatic connected with the said shifting-lever, for actuating the same in one direction, a main wind-chest, a pneumatic-valve for connecting the main wind-chest with the said pneumatic, and a tracker-board, over which passes the note-sheet, connected with the said pneumatic-valve, to operate the same for connecting the main wind-chest with the said pneumatic, as set forth.

22. A self-playing stringed musical instrument having a revoluble note-sheet carrier, carrying a plurality of revoluble spools arranged in a circle, each spool being adapted to carry a note-sheet roll, a winding-up roller for winding up or unwinding a note-sheet at a time, a gear-wheel on the shaft of the said winding-up roller, a shaft mounted to slide and to turn and carrying a pinion for engagement with the said gear-wheel, a driven pulley, rotating with the said shaft, a loose pulley on the said shaft, a clutch for connecting the driven pulley with the loose pulley, a second shaft mounted to turn and to slide and adapted to engage one of the spools for rotating the same, a driving connection between the said loose pulley and the said second shaft, a shifting-lever engaging the said shafts, for imparting sliding motion to the same in opposite directions, a reversing-pneumatic connected with the said shifting-lever, for actuating the same in one direction, a main wind-chest, a pneumatic-valve for connecting the main wind-chest with the said pneumatic, and a tracker-board, over which passes the note-sheet, connected with the said pneumatic-valve, to operate the same for connecting the main wind-chest with the said pneumatic, the note-sheet having a slot controlling the connection between the tracker-board and valve, as set forth.

23. A self-playing stringed musical instrument provided with a driven winding-up roller having flanges formed with hooks, a note-sheet roll having a bar in the outer end of the sheet, projecting beyond the sides of the sheet, the projecting ends being adapted to be engaged by the said hooks, and fixed spring guide-arms extending in the sides of the hooks, to hold the bar in place on the hooks, as set forth.

24. A self-playing stringed musical instrument provided with a driven winding-up roller having flanges formed with hooks, a note-sheet roll having a bar in the outer end of the sheet, projecting beyond the sides of the sheet, the projecting ends being adapted to be engaged by the said hooks, fixed spring guide-arms extending in the sides of the hooks, to hold the bar in place on the hooks, and swing-arms for engaging the bar, to move the latter in position for engagement by the hooks, as set forth.

25. A self-playing stringed musical instrument provided with a note-sheet having note-apertures and rows of staggered picking-apertures, a tracker-board over which passes the said note-sheet, and a pneumatic picking-action for picking the strings, controlled from the note-sheet and tracker-board, as set forth.

26. A self-playing stringed musical instrument provided with a note-sheet having note-apertures and rows of staggered picking-apertures, a tracker-board over which passes the said note-sheet, and a pneumatic picking-action for picking the strings, the said pneumatic-action including a rocking picker-bar, swinging pickers thereon, pneumatics for imparting motion to the picker-bar, controlled from the picking-apertures of the note-sheet and pneumatics for actuating the pickers, controlled from the note-apertures of the note-sheet, as set forth.

27. A self-playing stringed musical instrument provided with a tracker-board, a note-sheet passing over the tracker-board and provided with note-apertures, a picking-frame carrying pickers mounted to swing toward and from the strings, a pneumatic-action for imparting motion to the pickers on the said frame and controlled from the said note-apertures, a main wind-chest, a spring-pressed valve for connecting and disconnecting the main wind-chest and the wind-chest of the said action, the note-sheet being provided with a slot located in advance of the note-apertures and controlling the said valve, the note-sheet being further provided with a stopping-slot, a catch for holding the valve open against the tension of its spring and a stopping device for the pickers, comprising means for releasing the said catch to permit the valve to close to disconnect the action wind-chest and the main wind-chest, the said stopping device being controlled from the said stopping-slot, as set forth.

28. A self-playing stringed musical instrument, comprising a tracker-board, a note-sheet passing over the tracker-board and provided with note-apertures a slot in advance of the note-apertures, and a stopping-slot, a pneumatic picking-action for the strings controlled from the said note-apertures, a main wind-chest, a valve for connecting and disconnecting the main wind-chest and the wind-chest of the said action, the valve being controlled by the slot in advance of the note-apertures, an unwinding and rewinding mechanism, a reversing mechanism including a pneumatic connected with the said unwinding and rewinding mechanism, and controlled from the said stopping-slot, a device for holding the said valve open, and tripping mechanism for said device controlled from the said reversing-pneumatic to permit said valve to close to stop the picker-action, as set forth.

29. A self-playing stringed musical instrument provided with a tracker-board, a note-sheet for passing over the same and having note-apertures, rows of staggered picking-apertures and a stopping-slot, a pneumatic picking-action for picking the strings controlled from the note-sheet and tracker-board, a note-sheet spool, a winding-up roller, a driving and reversing mechanism for the said note-sheet spool and the winding-up roller, and a pneumatic controlled by said stopping-slot and connected with the said driving and reversing mechanism, as set forth.

30. A self-playing musical instrument provided with a tracker-board, a note-sheet for passing over the same and having a starting and a stopping slot, a note-sheet spool, a winding-up roller, a driving and reversing mechanism for the said note-sheet spool and the winding-up roller, a pneumatic controlled by the said stopping-slot and connected with the said driving and reversing mechanism, a transferring device for moving one end of the note-sheet from the spool over the tracker-board to the winding-up roller, and a pneumatic for controlling the said transferring device, controlled from the said starting-slot, as set forth.

31. A self-playing musical instrument provided with a tracker-board, a note-sheet for passing over the tracker-board and having a starting-slot, a note-sheet spool, a winding-up roller, a transferring device for moving the outer end of the note-sheet over the tracker-board to the winding-up roller, and a pneumatic for controlling the transferring device, controlled by the said starting-slot, as set forth.

32. A self-playing musical instrument provided with a note-sheet having a bar in its end, a tracker-board, a winding-up roller, a transferring device for engaging the bar and moving the end of the note-sheet over the tracker-bar to the said winding-up roller, a reversing mechanism for rewinding the note-sheet and unwinding it from the winding-up roller, and a locking device for the said reversing mechanism, controlled by the said bar, for unlocking the reversing mechanism, as set forth.

In testimony whereof we have signed our names to this specification in the presence of two subscribing witnesses.

WILLIAM R. VERSTRAELEN.
CHRISTIAN ALTER.

Witnesses:
   THEO. G. HOSTER,
   JNO. M. RITTER.